Sept. 28, 1926.

T. L. LOEHR 1,601,632

STEERING WHEEL

Filed May 19, 1926

T. L. Loehr
INVENTOR

BY Victor J. Evans
ATTORNEY

Sept. 28, 1926.

T. L. LOEHR 1,601,632

STEERING WHEEL

Filed May 19, 1926

T. L. Loehr
INVENTOR

BY Victor J. Evans
ATTORNEY

Patented Sept. 28, 1926.

1,601,632

UNITED STATES PATENT OFFICE.

THEODORE L. LOEHR, OF WALLACE, IDAHO.

STEERING WHEEL.

Application filed May 19, 1926. Serial No. 110,236.

This invention relates to steering wheels embodying a control apparatus for the acceleration of a vehicle whereby the common mistake of applying an accelerator instead of a brake pedal is overcome.

More specifically stated, the gripping portions of the wheel are connected and operable with a reciprocating sleeve connected with the throttle rod of a carburetor in order that the flow of gas may be constantly fed instead of kicking the foot accelerator when traveling upon rough roads which is injurious to the mechanism of the vehicle.

With the above and other objects in view, the invention further includes the following novel features and details of construction to be hereinafter more fully described, illustrated in the accompanying drawings and pointed out in the appended claims.

Figure 1:
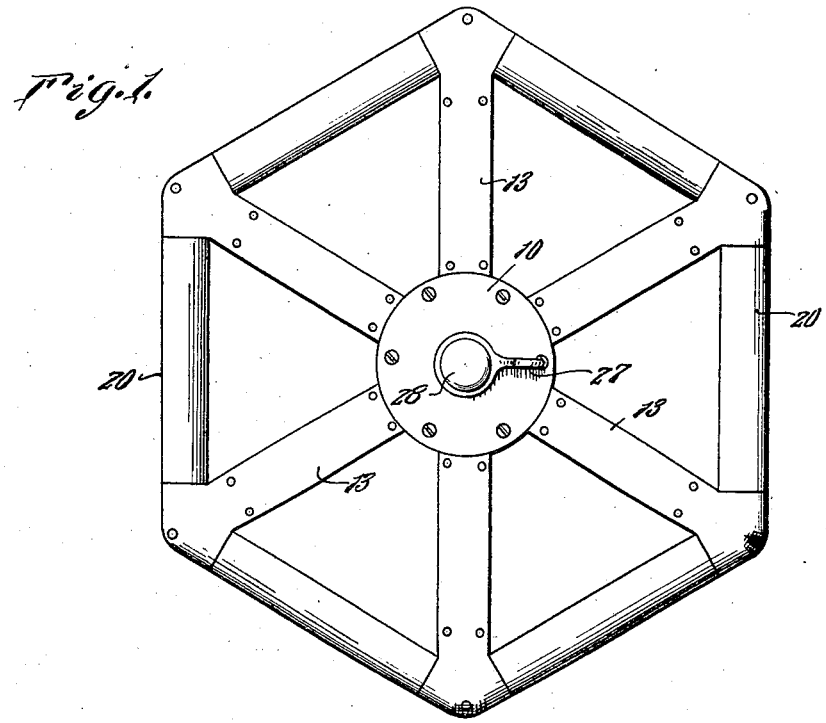
Figure 1 is an elevation of the invention.
Figure 3:
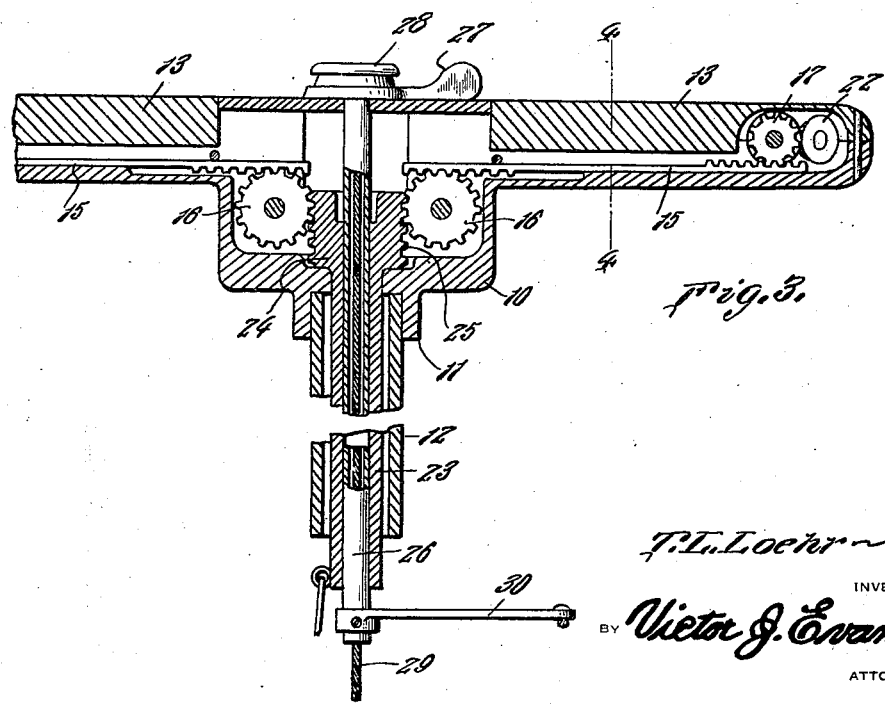
Figure 3 is a sectional view of the invention, and controlling apparatus.
Figure 2:
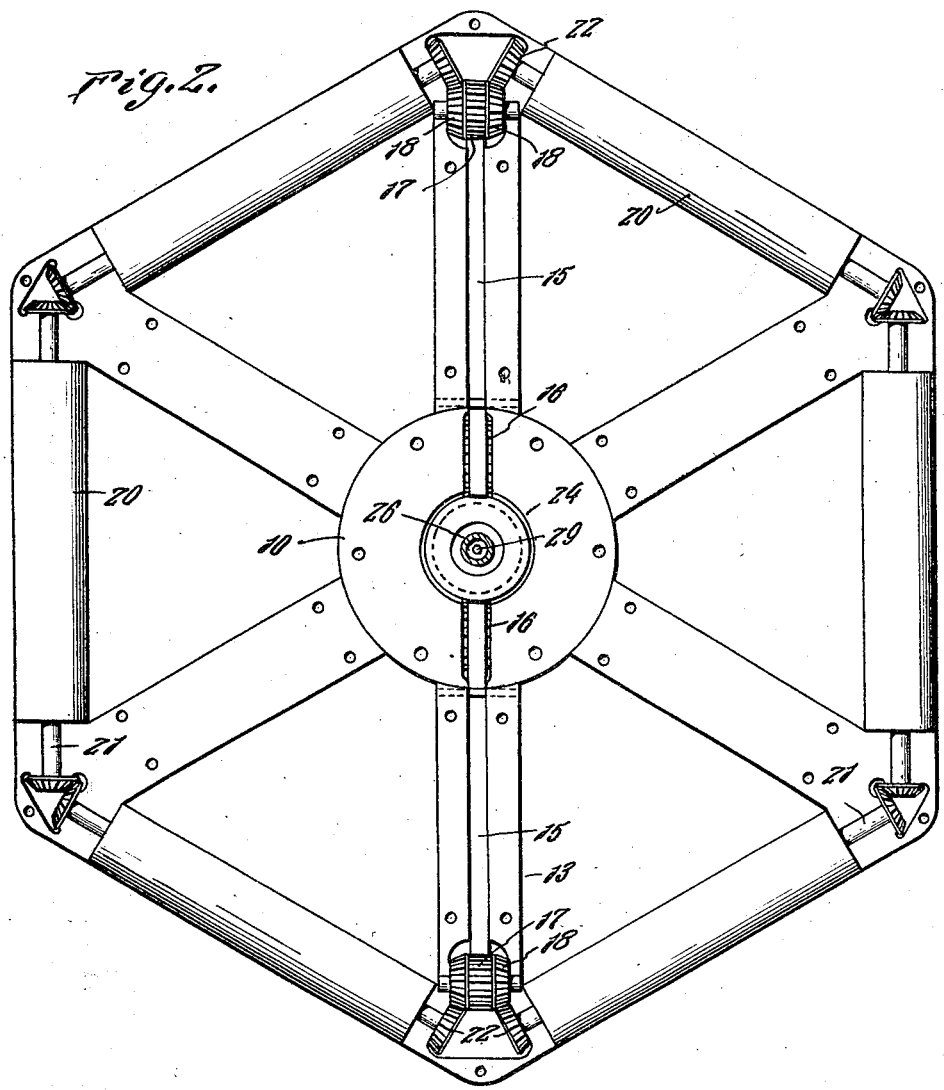
Figure 2 is a similar view with a portion of the spokes removed and illustrating the relative arrangement of the operating mechanism.
Figure 4:
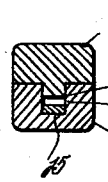
Figure 4 is a sectional view taken on the line 4—4 of Figure 3.

Referring to the drawings in detail wherein like characters of reference denote corresponding parts, the reference character 10 indicates the hub of a steering wheel providing a sleeve portion 11 depending from its underside and receiving the upper end of the steering post column 12 therein. Spokes 13 radiating from the hub and are preferably six in number to create a hexagon shaped wheel.

Slidingly mounted within channel portions 14 provided in the upper sides of diametrically opposed spokes are rack bars 15. The inner ends of the rack bars are meshed with gears 16 journalled within the hub of the wheel. The opposite ends of the rack bars are correspondingly meshed with gears 17 carrying oppositely disposed pinion gears 18 upon their opposite sides and adapted for simultaneous rotation therewith. The wheel is composed of upper and lower sections respectively. The handle or gripping portions 20 of the wheel, also six in number, provide bearing trunnions 21 upon their opposite ends with bevel gears 22 fixed thereon and meshing with the adjacent gear upon the corresponding end of a companion gripping portion. Obviously, the gears upon the ends of the handle or gripping portions 20, adjacent the gears 17 will mesh with the oppositely disposed bevel gears 18. Reciprocating within the hub 10 is a sleeve 23 providing the enlarged head portion 24 upon its upper end and groove portions 25 upon its outer sides within which the teeth of the gears 16 are received.

It will be noted that rotation of any one of the gripping or handle portions 20 will rotate its companion handle member to impart the necessary sliding movement to the rack bars 15 and rotary movement to the gears 16 in order that the necessary reciprocating action may be imparted to the sleeve 23. Such sleeve is connected with the throttle leading from the butterfly valve of a carburetor to control the acceleration of the vehicle. The invention is primarily designed to replace foot accelerators to which has been oftentimes attributed the approximate and immediate cause of accidents owing to the fact that a driver in his excitement depressed the foot accelerator instead of the brake pedal. The flow of the fuel mixture from the carburetor to the combustion chambers of an engine may be kept constant in order that no quick spurts of acceleration will occur, as in the instance of a foot accelerator when traversing rough road-ways.

Rotatably mounted within the sleeve 23 is a hollow shaft 26 having a control lever 27 fixed to its upper end exterior of the hub 10. A horn button 28 mounted upon the upper side of the control lever 27 has a conducting wire 29 leading therefrom and extending through the bore of the sleeve 26. The sleeve 26, in addition, provides an arm 30 upon its lower end which is in turn connected with a throttle rod associated with the ignition system of the vehicle.

It is to be noted from the foregoing description and accompanying drawings that the relative and set positions of the sleeves 23 and 26 respectively, will in no way be disturbed upon movement and rotation of the steering wheel in either direction.

The omission of the usual foot accelerator, supplanted by the hand accelerator will leave the right foot free and uncramped, which may the more quickly be called into use in expediting the application of the vehicle service brakes.

The invention is susceptible of various changes in its form, proportions and minor details of construction, and the right is herein reserved to make such changes as properly fall within the scope of the appended claims.

I claim:—

1. A steering wheel embodying a control apparatus, the control apparatus is in the nature of handle portions forming component parts of the wheel, a sleeve member mounted for reciprocatory movement within the hub of a wheel, means for collectively and simultaneously operating the handle portions, and means connecting the handle portions with the sleeve member to impart the necessary reciprocatory movement thereto.

2. A steering wheel embodying a control apparatus comprising handle members, said handle members are journaled within the spokes of the wheel, gearing means connecting the ends of the spokes for collectively and simultaneously operating the same, a sleeve member carried within the hub of the wheel, gearing means journaled within the hub and connected with the sleeve member, and rack bars operable within the spokes of the wheel and connected with the handle members, and gearing means for reciprocating the sleeve member within the hub.

3. A steering wheel embodying a control apparatus comprising handle members journaled within the spokes of the wheel, rack bars slidingly mounted within the spokes of the wheel, intermeshing gears fixed upon the ends of the handle members, gearing means carried by the spokes and connected with the intermeshing gears and rack bars respectively, rotatable gears mounted within the hub of the wheel, a sleeve member carried by the hub and including an enlarged head engageable with the rotatable gears to impart the necessary reciprocating movement thereto, a sleeve member rotatably mounted within the reciprocating sleeve, and means connected with the ends of the sleeve members with the fuel and ignition system of the vehicle substantially as set forth.

4. A steering wheel comprising handle members forming component parts thereof, said members being journaled between the spokes of the wheel, pinions carried upon the extremities of the members, gears journaled within the ends of the spokes and terminating to provide pinions upon their ends for meshing engagement with the pinions of the adjacent handle members, a reciprocating sleeve carried within the hub of the wheel, gear members mounted within the hub and operable in conjunction with the sleeve, and rack bars slidingly mounted within the spokes and communicating with the gears in the spokes and hub whereby movement of any one of the handle members will collectively operate its companion members simultaneous with the reciprocation of the sleeve.

In testimony whereof I affix my signature.

THEODORE L. LOEHR.